United States Patent [19]

Bauman et al.

[11] 4,057,842

[45] Nov. 8, 1977

[54] CURRENT REGULATION SYSTEM FOR THREE-PHASE LOAD

[75] Inventors: Bruce K. Bauman, Glen Rock; Dean K. Norbeck; Donald L. Tollinger, both of York, all of Pa.

[73] Assignee: Borg-Warner Corporation, Chicago, Ill.

[21] Appl. No.: 652,915

[22] Filed: Jan. 28, 1976

[51] Int. Cl.² .......................... H02H 3/08; G05F 1/44
[52] U.S. Cl. ........................................ 361/93; 323/9; 361/31
[58] Field of Search ................. 323/4, 9, 6; 317/27 R, 317/33 SC; 361/28 (U.S. only), 31, 93 (U.S. only), 94 (U.S. only), 100 (U.S. only)

[56] References Cited

U.S. PATENT DOCUMENTS

| 3,176,215 | 3/1965 | Kusko | 323/4 |
|---|---|---|---|
| 3,387,205 | 6/1968 | Tesdall | 323/9 |
| 3,611,043 | 10/1971 | Steen | 317/33 SC |
| 3,633,073 | 1/1972 | Day et al. | 317/22 |
| 3,743,921 | 7/1973 | Legg et al. | 323/4 |
| 3,800,189 | 3/1974 | Montz | 317/27 R |

FOREIGN PATENT DOCUMENTS

| 977,132 | 12/1974 | United Kingdom | 323/6 |
|---|---|---|---|

OTHER PUBLICATIONS

IBM Tech. Disc. Bulletin vol. 18, No. 3, Aug. 75, pp. 798,799 "DC Current Sense Ckt. for AC-DC Converters" by G. C. Johari.

*Primary Examiner*—Gerald Goldberg
*Attorney, Agent, or Firm*—James E. Tracy

[57] ABSTRACT

The load currents, supplied by a three-phase AC power source to a three-phase load, are established and maintained at a preset desired level by sensing those currents and producing a feedback voltage which is compared with a reference potential. Anytime the load currents differ from the desired level the comparison produces a difference or error signal which causes an adjustment of the amplitudes of the three load currents such that they automatically return to the desired level, thereby regulating the current flow to the load. At start-up, the feedback arrangement is also effective in preventing instant current build-up to avoid sudden power surges. When the load is a three-phase motor, limiting the current flow facilitates a soft start with the motor gradually accelerating to full operating speed. Two overload protection circuits shut the system down in response to different overload or overcurrent conditions. One operates when the peak-to-average ratio of the load currents is higher than normal, and the other protection circuit actuates when the peak current is higher than desired.

3 Claims, 1 Drawing Figure

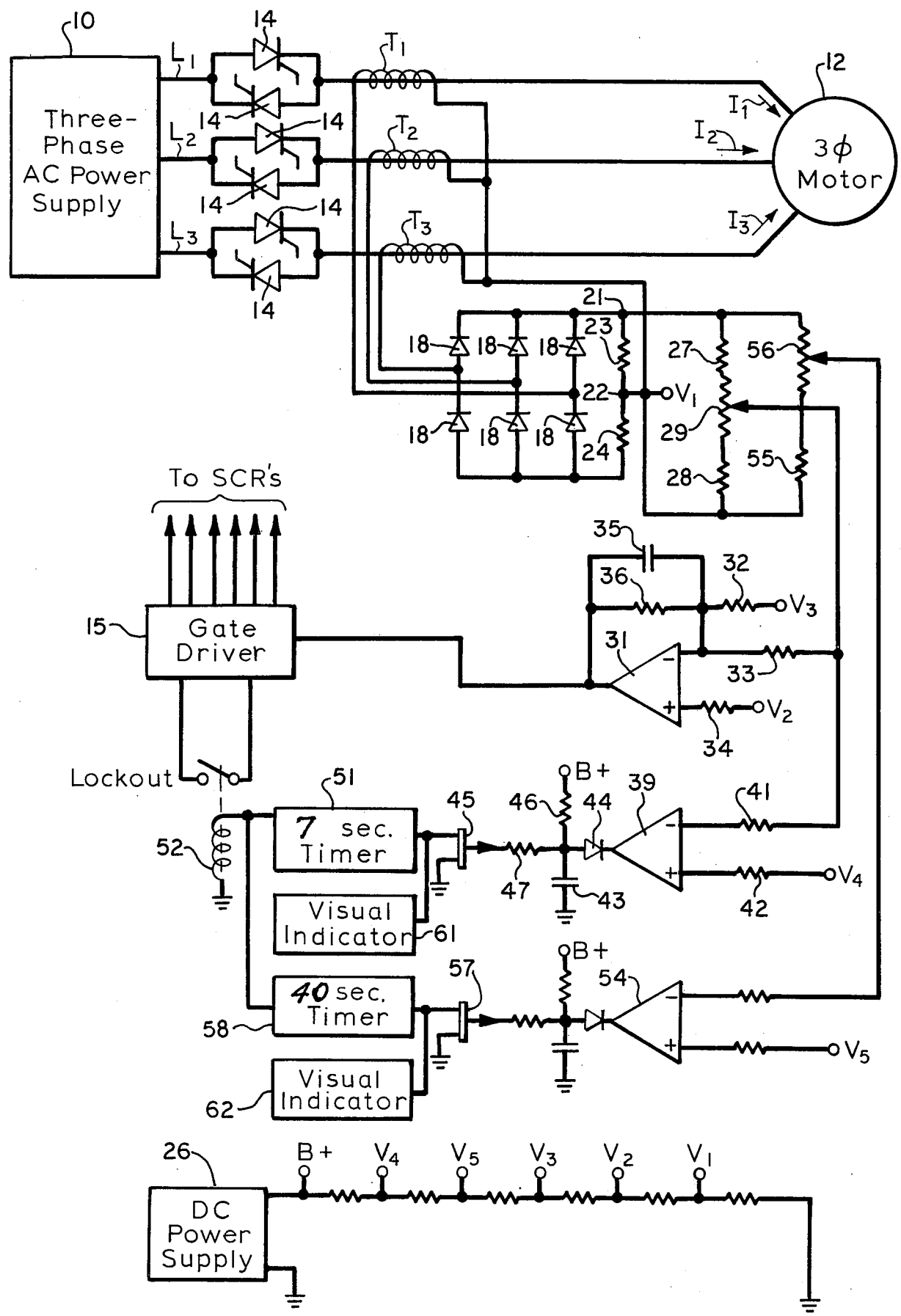

CURRENT REGULATION SYSTEM FOR THREE-PHASE LOAD

BACKGROUND OF THE INVENTION

This invention relates generally to a control circuit for a three-phase load and particularly to a solid state control system for regulating the current flow to the load so that it remains at a constant desired level. At the same time, the control system also protects the load against adverse overload or overcurrent conditions.

Current control and regulation systems have been developed, but none of those previous systems can match the performance of that of the present invention. The control system herein disclosed is highly efficient and reliable and performs functions and achieves results that are not obtainable with the prior arrangements.

SUMMARY OF THE INVENTION

The control system of the invention regulates and limits the current flow from a three-phase AC power supply to a three-phase load. Monitoring means senses the three load currents, supplied to the load, and produces a feedback signal proportional to the amplitude thereof. The feedback signal is then compared in a comparison means with a reference signal effectively representing a desired level for the load currents. An error signal, produced by the comparison means, is proportional to the average of the difference between the two compared signals. Control means, which operates in response to the error signal, adjusts the amplitude of the three load currents in order to maintain them at the desired level.

DESCRIPTION OF THE DRAWING

The features of the invention which are believed to be novel are set forth with particularity in the appended claims. The invention, together with further advantages and features thereof, may best be understood, however, by reference to the following description in conjunction with the accompanying drawing which schematically illustrates a control system, constructed in accordance with one embodiment of the invention, and the manner in which the control system limits and regulates the current flow to a three-phase load.

DESCRIPTION OF THE ILLUSTRATED EMBODIMENT

Block 10 represents a conventional three-phase AC power supply having three terminals each of which provides an alternating voltage, varying in sinusoidal fashion, of the same RMS or root-mean-square amplitude and the same commutating frequency, the three alternating voltages being phase-displaced with respect to each other by 120°. Since there is no neutral line from the power supply, each of the phase voltages is actually a line-to-line voltage and appears or is produced at one terminal of power supply 10 relative to another of its terminals. The RMS magnitude of each phase voltage may take any appropriate value depending on the characteristics of the load to be energized. As illustrated, the load takes the form of a three-phase motor 12 which may, for example, function as the compressor motor in a large capacity air-conditioning system. Such a compressor motor may require phase voltages as high as 600 volts. The commutating frequency of the phase voltages will usually be either 50 or 60 cycles per second or hertz.

Three load or phase currents $I_1$, $I_2$ and $I_3$ flow through line conductors $L_1$, $L_2$ and $L_3$ to load 12 via the six silicon controlled rectifiers or SCR's 14 which are controlled by gate driver 15 whose six outputs connect to the gates of respective ones of the six SCR's. Each SCR can conduct, during each positive polarity half cycle of the sinusoidal voltage applied thereto, when the SCR's anode is positive relative to its cathode. However, conduction will not occur during a positive half cycle until gate current is supplied to the SCR's gate. At that instant, the SCR fires into conduction or turns on and permits load current to flow therethrough until the end of the positive half cycle. The greater the time delay or delay angle between the start of a positive half cycle and the turning on or firing of the SCR, the less the conduction time, thereby allowing less load current to flow. The construction of gate driver 15 may take any appropriate form in order to provide adjustably timed gate current pulses under the control of a signal applied to the gate driver. With such a construction, the magnitude of the three load currents can easily be varied merely by changing the timing of the gate signals. Preferably, driver 15 constitutes a Solid State Hard Firing PHASETROL SCR Gate Drive, Model VPH1319, manufactured by Vectrol, Inc., Rockville, Maryland.

Regulation and limiting of the three load currents $I_1$, $I_2$ and $I_3$ is obtained by monitoring or sensing those load currents by means of current transformers $T_1$, $T_2$ and $T_3$ which develop currents proportional to the load currents. They are added and rectified by the three phase full wave bridge consisting of the six diodes 18, and converted to a voltage signal across circuit junctions 21 and 22 by resistors 23 and 24. A distinguishing feature of this configuration is that the current transformers are wye connected with the center of the wye (junction 22) as the reference. This allows any current imbalance between the load currents $I_1$, $I_2$ and $I_3$ to be reflected at full relative magnitude across junctions 21 and 22. Hence, the voltage across resistor 23 will be proportional to the greatest or highest of the three load currents.

Junction 22 is held at a fixed potential VI above ground in order that a single DC power supply may be employed for the entire system. This is illustrated by block 26 and the voltage dividing, resistor network connected to its output.

The adjustable voltage divider comprising fixed resistors 27 and 28 and potentiometer 29 provides a feedback signal (at the variable tap of the potentiometer) for application to the negative input of differential amplifier 31, which serves as an error amplifier. The output of the differential amplifier is proportional to the difference between the feedback signal and the reference voltages V2 and V3. Resistors 32, 33 and 34 constitute bias resistors for differential amplifier 31. The gain of the amplifier is controlled by the ratio of feedback resistor 36 to the bias resistors. Feedback capacitor 35 functions with resistor 36 to integrate the error signal so that the output voltage of amplifier 31 will be proportional to the time average of the error signal. This configuration is discussed on page 217 in the book Operational Amplifiers; Tobey et al, Ed.; McGraw Hill Book Company; 1971.

The error voltage produced by amplifier 31 controls the timing of the gate pulses produced by gate driver 15, thereby to control the conduction times of the SCR's and the magnitude of the load currents flowing to motor 12. Differential amplifier 31 thus effectively compares the feedback signal (from the tap of potentiometer 29) to a reference level and produces an error voltage proportional to the average of the difference between the two. If the load currents are established at the desired level, both of the inputs of amplifier 31 will be at the same potential and the error signal will be zero. With that value, gate driver 15 will operate such that the SCR's conduct as necessary to maintain the load currents at the desired level. If the load currents tend to increase, the feedback voltage will increase in a positive sense and cause the output of amplifier 31 to go negative. This in turn causes gate driver 15 to increase the delay angles of the SCR's so that the load currents are reduced to the desired level, whereupon the error signal becomes zero again. Of course, if the load currents tend to decrease the opposite action occurs.

During start-up when the system is initially rendered operative, the feedback arrangement functions to prevent instant current build-up thereby avoiding sudden power surges. This is a particularly attractive feature when the load constitutes a motor. Limiting the current flow to the motor facilitates a soft start, namely the motor is permitted to gradually accelerate to full operating speed without any sudden inrush of current. Retardation of the load currents at start-up occurs since at that time the feedback signal will be positive-going and this causes the error voltage to increase the delay angles (thereby decreasing the conduction times) of the SCR's.

Of course, if the desired level for the load currents must be changed (for example when a different type motor or load is substituted) this may be done merely by adjusting potentiometer 29. Moreover, this is an advantageous feature since varying the feedback signal, rather than the reference voltage applied to amplifier 31, permits the loop gain of the system to remain constant regardless of the load that is being controlled. This helps to insure that the control system will be stable for different types of loads.

Differential amplifier 39, whose negative input is also connected to the tap of potentiometer 29, is connected in an open loop configuration and provides an overload protection circuit. Resistors 41 and 42 serve as bias resistors for the amplifier. Reference voltage V4 is selected so that if, during the time that amplifier 31 is controlling the average current to the proper level, the peak-to-average ratio of the load currents is higher than desired, the output voltage of differential amplifier 39 will be driven low. This discharges capacitor 43 through diode 44 causing field effect transistor 45 to conduct. When this condition occurs, the output of differential amplifier 39 (which effectively constitutes an overload signal) switches at the commutating frequency of the AC power supply. However, due to the presence of diode 44, capacitor 43 is forced to charge slowly through resistor 46. This permits field effect transistor 45 to remain in conduction continuously as long as the allowable peak-to-average ratio is exceeded. Resistor 47 is included to limit the gate current of transistor 45 to a safe value.

If the overload or overcurrent condition sensed by amplifier 39 remains in effect for a given time delay interval, the system is shut down so that no current flows to load 12. This is achieved by means of timer 51 which is actuated by field effect transistor 45 when the transistor conducts. If transistor 45 remains conductive for at least seven seconds, at the end of that period timer 51 energizes relay 52. Any suitable timing advice may serve the function of timer 51. Preferably, the timer takes the form of that illustrated and described in U.S. Pat. No. 3,633,073 issued Jan. α, 1972 to Arthur R. Day III and Francis A. Kimpel, and assigned to the present assignee. When relay 52 energizes, a pair of lockout contacts are closed which effectively disables the gate driver so that it cannot supply gate pulses to the SCR's. Of course, a seven second time delay is introduced before shutdown to avoid undesired nuisance shutdowns otherwise caused by transient or momentary conditions. It is to be noted that both the desired current level and the allowable peak-to-average overload are set with only one contol, namely potentiometer 29.

Differential amplifier 54 and its associated circuitry provide another overload protection circuit and is a duplicate of the overload sensing circuit described above, with the exception that the negative input of amplifier 54 is fed independently from junctions 21 and 22 by way of the variable divider consisting of fixed resistor 55 and potentiometer 56. The overload protection circuit is adjusted to trip at a peak current level which is independent of the average current being controlled by amplifier 31. When the peak current is higher than desired, differential amplifier 54 causes field effect transistor 57 to conduct, whereupon timer 58 is actuated and if, after a 40 second interval, the peak value of the load currents still exceeds a predetermined allowable level then relay 52 is energized to shut the system down. Timer 58 may also take the construction shown in U.S. Pat. No. 3,633.073. As indicated by blocks 61 and 62, anytime an overload condition is sensed by either one of the two overload protection circuits, an appropriate visual indicator illuminates to alert the operating personnel of the abnormal condition. Of course, if desired audible alarms may also be energized when overload conditions are detected.

The invention provides, therefore, a unique control system for regulating and limiting the average current flow to a three-phase load, while at the same time protecting the load against overload conditions in which either the peak-to-average ratio of the current is higher than normal, regardless of the magnitude of the current being controlled, or the peak current is higher than desired.

While a particular embodiment of the invention has been shown and described, modifications may be made, and it is intended in the appended claims to cover all such modifications as may fall within the true spirit and scope of the invention.

We claim:

1. A control system for regulating the current flow at a desired level from a three-phase AC power supply to a three-phase load, comprising:

coupling means, including three line conductors, for coupling the three-phase AC power supply to the threephase load to supply three load currents thereto;

three wye-connected current transformers, each of which is coupled to a respective one of said three line conductors, for sensing the three load currents and developing currents proportional to the load currents;

a three-phase full wave bridge circuit, having an output resistor, for rectifying and adding the currents, developed by said current transformers, to produce an output voltage signal across said resistor, the center of said wye-connected transformers and one terminal of said output resistor being interconnected and held at a fixed reference potential in order that any current imbalance between the three load currents is reflected at full relative magnitude across said output resistor, said output voltage signal being proportional to the greatest of the three load currents;

means, including a potentiometer, coupled to said output resistor for developing a feedback signal proportional to said output voltage signal, the desired level of the three load currents being set by adjusting said potentiometer;

comparison means, including a differential amplifier, for comparing said feedback signal with a reference signal to produce an error signal proportional to the difference between the two compared signals;

and control means, coupled to said coupling means, responsive to said error signal for adjusting the amplitudes of the three load currents in order to maintain them at the desired level.

2. A control system according to claim 1 and including overload protection means, responsive to and controlled by said feedback signal, for interrupting the current flow to the load to shut the system down anytime the peak-to-average ratio of the load currents exceeds a preset allowable level and remains there for a given time delay interval.

3. A control system according to claim 1 and including means, comprising another potentiometer, responsive to said output voltage signal for providing a control signal, and including additional overload protection means, responsive to and controlled by said control signal, for interrupting the current flow to the load to shut the system down anytime the peak value of the load currents exceeds a predetermined allowable level and remains there for a predetermined time delay interval.

* * * * *